United States Patent
Baughman et al.

(10) Patent No.: US 9,336,497 B2
(45) Date of Patent: May 10, 2016

(54) SYSTEM AND METHOD FOR AN EXPERT QUESTION ANSWER SYSTEM FROM A DYNAMIC CORPUS

(71) Applicant: International Business Machines Corporation, Armonk, NY (US)

(72) Inventors: Aaron K. Baughman, Silver Spring, MD (US); Louis B. Capps, Jr., Georgetown, TX (US); Barry M. Graham, Silver Spring, MD (US); Jennifer R. Mahle, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 14/148,261

(22) Filed: Jan. 6, 2014

(65) Prior Publication Data
US 2015/0193682 A1    Jul. 9, 2015

(51) Int. Cl.
*G06N 5/04* (2006.01)
*G06N 99/00* (2010.01)

(52) U.S. Cl.
CPC ............... *G06N 99/005* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 7,454,393 B2 | 11/2008 | Horvitz et al. | |
| 7,739,215 B2 | 6/2010 | Horvitz et al. | |
| 7,853,544 B2 | 12/2010 | Scott et al. | |
| 2009/0070113 A1 | 3/2009 | Gupta et al. | |
| 2010/0095269 A1 | 4/2010 | Bouillet et al. | |
| 2011/0125734 A1 | 5/2011 | Duboue et al. | |

OTHER PUBLICATIONS

Brown et al., "Probabilistic Method of Aligning Sentences with their Translations using Word Cognates", IBM Technical Disclosure, IPCOM000111445D, ip.com Prior Art Database.
Malkin et al., FYI on Question and Answers: Answers to commonly asked "experienced Internet user" questions, Internet Society Requests for Comment Technical Disclosure, IPCOM000002021D, ip.com Prior Art Database.
Chen et al, "Efficient Information Extraction over Evolving Text Data".
Perkins, "Corpus Bootstrapping with NLTK", http://strataconf.com/strata2012/public/schedule/detail/22412.

*Primary Examiner* — Alex Gofman
*Assistant Examiner* — Umar Mian
(74) *Attorney, Agent, or Firm* — Douglas Lashmit; Hoffman Warnick LLC (57) ABSTRACT

Various embodiments provide systems, computer program products and computer implemented methods. Some embodiments include a method of updating an expert corpus set, including obtaining a query from a user, obtaining a raw data source, determining a relevance score for the raw data source with respect to the query, by performing actions including creating a first vector of statistical variables for the query using at least one natural language processing (NLP) socket, the statistical variables having category types, creating a second vector for the first raw data source, having category types that are the same as those for the query and generating a hypothesis regarding the relevance of the raw data source, testing the hypothesis by comparing relative statistical variables, calculating a gradient between the vectors to determine the relevance score and updating the expert corpus set with the raw data in response to the relevance score exceeds a threshold.

17 Claims, 6 Drawing Sheets

SYSTEM AND METHOD FOR AN EXPERT QUESTION ANSWER SYSTEM FROM A DYNAMIC CORPUS

FIELD

The subject matter disclosed herein relates generally information processing. More particularly, the subject matter disclosed relates to natural language information in corpora that may be shared.

BACKGROUND

Computer systems and computational architectures are being developed that have the ability to generate answers to natural language questions. Question and answer systems typically depend on automated processes for analyzing questions and for composing answers from a large corpus of information. Traditional Natural Language Processing (NLP) applications define a plurality of corpus sets that comprise complete corpora for natural language understanding. Limits on these types of systems are imposed because of the limits on the corpora of information.
Specializations within a scholastic area provide the benefit of deep knowledge to solve difficult problems that could not be comprehended by the generalist. However, specialized fields produce independent languages, terms, symbols, and ultimately datasets that are not known outside of a specialist's field. The data sets might be used as input into custom algorithms for analysis without the need for social algorithm application.

Natural Language Processing systems ingest may corpora that are filtered and provided by users into a central staging area. Users or data modelers often create independent data sources or have knowledge sources that are not within the perspective of all members of an entire team. Too often, many different specialists have access to knowledge bases that are not shared with generalists or with specialists in different fields.

Conventional ways of sharing data for use by members of teams who might not have specialized knowledge include manual corpus selection and deletion, team communication to track candidate corpus sets, customer meetings for corpus set selection, non-conditional corpora delta loading, ad hoc NLP scaling, parallelizing corpus processing and team repository sites such wiki's and team rooms.

BRIEF DESCRIPTION

Various aspects of the invention provide for systems, computer program products and computer implemented methods. In some embodiments, a system includes a method of updating an expert corpus set, the method including obtaining a query from a first user, obtaining a first raw data source, determining a first relevance score for the first raw data source with respect to the query, by performing actions including creating a first vector of statistical variables for the query using at least one natural language processing (NLP) socket, the statistical variables of the first vector having category types, creating a second vector of statistical variables for the first raw data source, the statistical variables for the first raw data source having category types that are the same as the category types of the statistical variables for the query, and generating a hypothesis regarding the relevance of the first raw data source with respect to the query, testing the hypothesis by comparing each statistical variable for the query to each same statistical variable for the first raw data source, calculating a gradient between the first vector and the second vector to determine the first relevance score and updating the expert corpus set by ingesting the first raw data source into the expert corpus in response to determining the first relevance score exceeds a first threshold.

A first aspect provides a method of updating an expert corpus set, the method comprising: obtaining a query from a first user; obtaining a first raw data source; determining a first relevance score for the first raw data source with respect to the query, by performing actions including: creating a first vector of statistical variables for the query using at least one natural language processing (NLP) socket, the statistical variables of the first vector having category types; creating a second vector of statistical variables for the first raw data source, the statistical variables for the first raw data source having category types that are the same as the category types of the statistical variables for the query; and generating a hypothesis regarding the relevance of the first raw data source with respect to the query; testing the hypothesis by comparing each statistical variable for the query to each same statistical variable for the first raw data source; calculating a gradient between the first vector and the second vector to determine the first relevance score; and updating the expert corpus set by ingesting the first raw data source into the expert corpus in response to determining the first relevance score exceeds a first threshold.

A second aspect provides a system comprising: at least one computing device configured to update an expert corpus set, by performing actions including: obtaining a query from a first user; obtaining a first raw data source; determining a first relevance score for the first raw data source with respect to the query, by performing actions including: creating a first vector of statistical variables for the query using at least one natural language processing (NLP) socket, the statistical variables of the first vector having category types; creating a second vector of statistical variables for the first raw data source, the statistical variables for the first raw data source having category types that are the same as the category types of the statistical variables for the query; and generating a hypothesis regarding the relevance of the first raw data source with respect to the query; testing the hypothesis by comparing each statistical variable for the query to each same statistical variable for the first raw data source; calculating a gradient between the first vector and the second vector to determine the first relevance score; and updating the expert by ingesting the first raw data source into the expert corpus in response to determining the first relevance score exceeds a first threshold.

A third aspect provides computer program product comprising program code stored on a computer-readable storage medium, which when executed by at least one computing device, enables the at least one computing device to implement a method of updating an expert corpus set by performing actions including: obtaining a query from a first user; obtaining a first raw data source; determining a first relevance score for the first raw data source with respect to the query, by performing actions including: creating a first vector of statistical variables for the query using at least one natural language processing (NLP) socket, the statistical variables of the first vector having category types including at least one of lexical answer type, sentence focus frequencies or entity type; creating a second vector of statistical variables for the first raw data source, the statistical variables for the first raw data source having category types that are the same as the category types of the statistical variables for the query; and generating a hypothesis regarding the relevance of the first raw data source with respect to the query; testing the hypothesis by comparing each statistical variable for the query to each same statistical variable for the first raw data source; calculating a gradient between the first vector and the second vector to determine the first relevance score; and updating the expert by ingesting the first raw data source into the expert corpus in response to determining the first relevance score exceeds a first threshold.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

DETAILED DESCRIPTION OF THE INVENTION

The subject matter disclosed herein relates generally to corpora of information. More particularly, the subject matter disclosed relates to updating an expert corpus set in response to receipt of a relevant raw data source.

As differentiated from conventional systems of information sharing and corpus building, various embodiments described herein provide a system and method for sharing potential raw data sources. The raw data sources may be placed within a drop zone that is connected to a centralized server for processing. The raw data source may be measured to determine the applicability of the new raw data source, from which derived artifacts can be produced. Artifacts may be described as features or patterns contained in a dataset, which can be derived based on statistical analysis of dataset using NLP, for example. Further, statistics such as entity type, lexical answer type, and sentence focus frequencies are assigned to each raw data source (as candidate corpus), to aid in the decision of which candidate raw data sources to accept and further, which ones to load into an expert corpus set.

The singular knowledge regarding a particular raw data source is captured by embodiments described herein, through a sharing mechanism. Further, the volume of candidate corpus sets increases substantially after NLP feature extraction, domain independent/dependent index creation, and artifacts that support custom analytics. Such a large data challenge may be scaled to data push or code push solutions on parallel machines. However, each project generally has a finite amount of resources for NLP. Embodiments described herein may prioritize the loading and linking to promoted candidate corpus sets, ranking them based on a predetermined scoring mechanism, which could, for example, be based on the user's definition of most relevant or important topics. Additionally, the user could select an option for the system to automatically score the datasets, based on some metric, which could be derived from the questions users ask the QA system If corpora are added that provide additional information about a question a user asked previously, the system may update the answer to include the additional information, notifying the user of the updated answer. The invention also enables disperse users to tag and share potential artifacts and data sources as candidate corpus sets.

As discussed above, the field of NLP is producing a human language interface between humans and machines. Such interfaces are enabling broadly applicable question and answer systems. By combining both specialized knowledge and data sets with NLP according to embodiments described herein, question and answer (QA) systems may provide customized corpora based on a domain. According to embodiments, the automatic discovery of data sets and the statistical measurement of such sets may provide summaries correlated to the types of questions asked for selection of corpus sets. Embodiments may also enable disperse users to tag and share potential artifacts and data sources as candidate corpus sets.

Embodiments described here may include social sharing of data sets for NLP discovery, generation of candidate corpus sets and perpetual training of the QA expert corpus set; that is the expert corpus may be customized for evolving user interests and questions. Further, embodiment may provide correlation of corpora statistics to that of question statistics.

According to aspects, users may create data sources that are not within the perspective of the entire team. Embodiments described provide systems and methods for sharing potential raw data sources, reducing the instances of singular knowledge regarding a particular source, as these sources are captured by embodiments through a sharing mechanism. Each user may share raw data sources in a drop zone (DZ). The shared raw data sources can be user-selected or the user can install a program on their computer that scans the user's computer for potentially useful raw sources on a predetermined schedule. Methods according to embodiments may then add the raw sources identified as potentially useful to the drop zone. Users can also add tags to the data sources.

Figure 1:
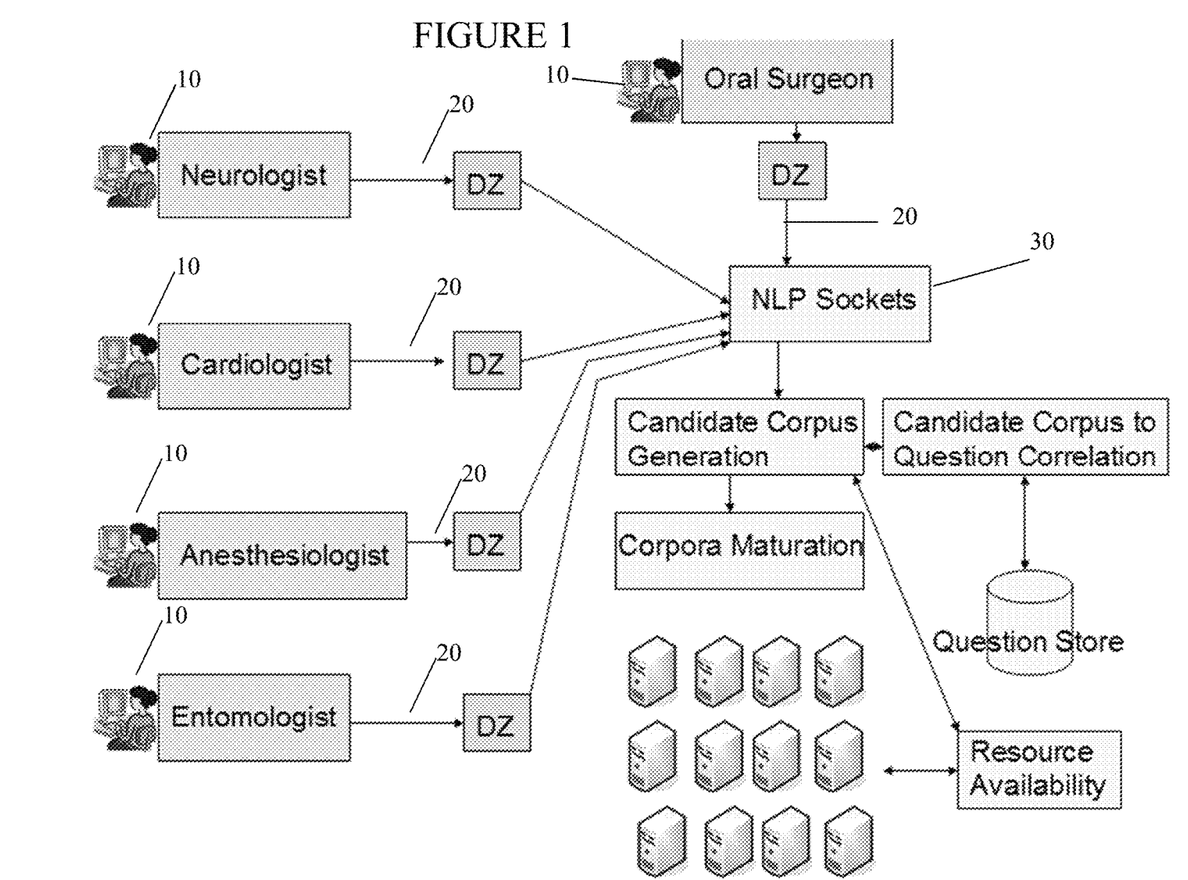
FIG. 1 shows an illustrative environment according to various embodiments.

Turning now to FIG. 1, an illustrative environment according to various embodiments is shown. Users 10 are illustrated. Users 10 may be members of different professions, however the professions shown are illustrative and not intended to be limiting of the scope of the embodiments. Users 10 may place raw data sources 20 into drop zones DZ. The drop zones may be associated with central servers or with the personal computers of the users 10. The raw data sources 20 may be sent from the drop zones to at least one Natural Language Processing (NLP) socket 30, e.g. in response to a query. The raw data sources may be ingested into an expert corpus set in an effort to mature the expert corpus set. The raw data sources may be the subject of candidate corpus generation. FIG. 1 illustrates a question store which may be used to store user queries. The stored queries may be used in methods according to various embodiments to update answers sent to the users who created the queries.

Figure 2:
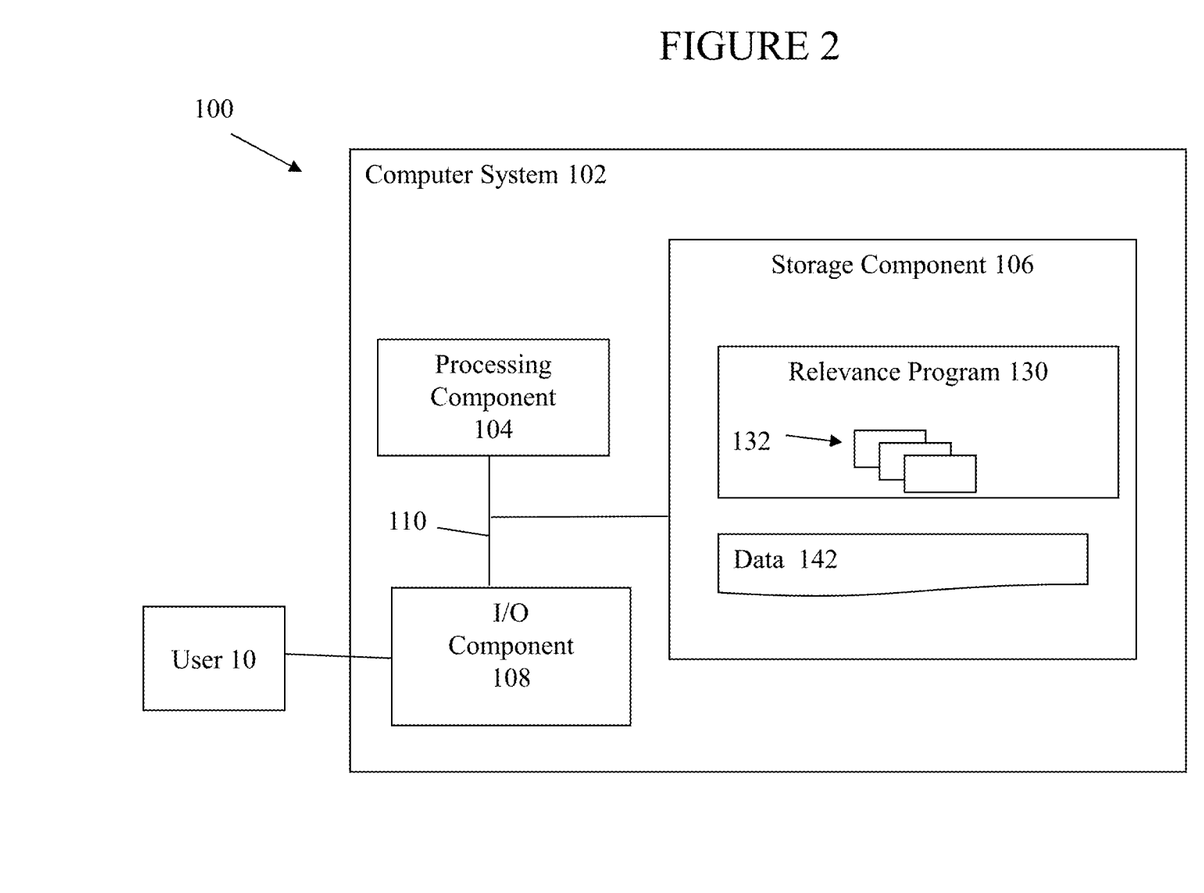
FIG. 2 shows an illustrative environment according to various embodiments.

FIG. 2 depicts an illustrative environment 100 for updating at least one expert corpus set. To this extent, the environment 100 includes a computer system 102 that can perform a process described herein in order to update the expert corpus sets and to perform all other related processes. In particular, the computer system 102 is shown as including a relevance program 130, which makes computer system 102 operable to handle all necessary calculations and functions by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the relevance program 130, which maybe at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a user 10 to interact with the computer system 102 and/or one or more communications devices to enable a system user 10 to communicate with the computer system 102 using any type of communications link. User 10 may be a human, including, but not limited to the user that supplies a query or a raw data source, a different computer user, or a non-human system. Relevance program 130 can manage a set of interfaces (e.g., graphical user interface(s), application program interface, etc.) that enable human and/or system users 10 to interact with relevance program 130. Further, relevance program 130 can manage (e.g., store, retrieve, create, manipulate, organize, present, etc.) data, such as ERH data 142, etc., using any solution.

In any event, the computer system 102 can comprise one or more general purpose computing articles of manufacture (e.g., computing devices) capable of executing program code, such as relevance program 130, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, relevance program 130 can be embodied as any combination of system software and/or application software.

Further, relevance program 130 can be implemented using a set of modules 132. In this case, a module 132 can enable the computer system 102 to perform a set of tasks used by relevance program 130, and can be separately developed and/or implemented apart from other portions of relevance program 130. As used herein, with reference to the computer system hardware, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of relevance program 130 fixed thereon (e.g., one or more modules 132). However, it is understood that the computer system 102 and relevance program 130 are only representative of various possible equivalent computer systems that may perform a process described herein. To this extent, in other embodiments, the functionality provided by the computer system 102 and relevance program 130 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide EHR data 142; such data 142 may be used for any appropriate solution. For example, the computer system 102 can generate and/or be used to generate data 142, retrieve data 142, from one or more data stores, receive data 142 from another system, send 142 to another system, receive data 142 from a human or non-human user 10, etc.

Figure 3:
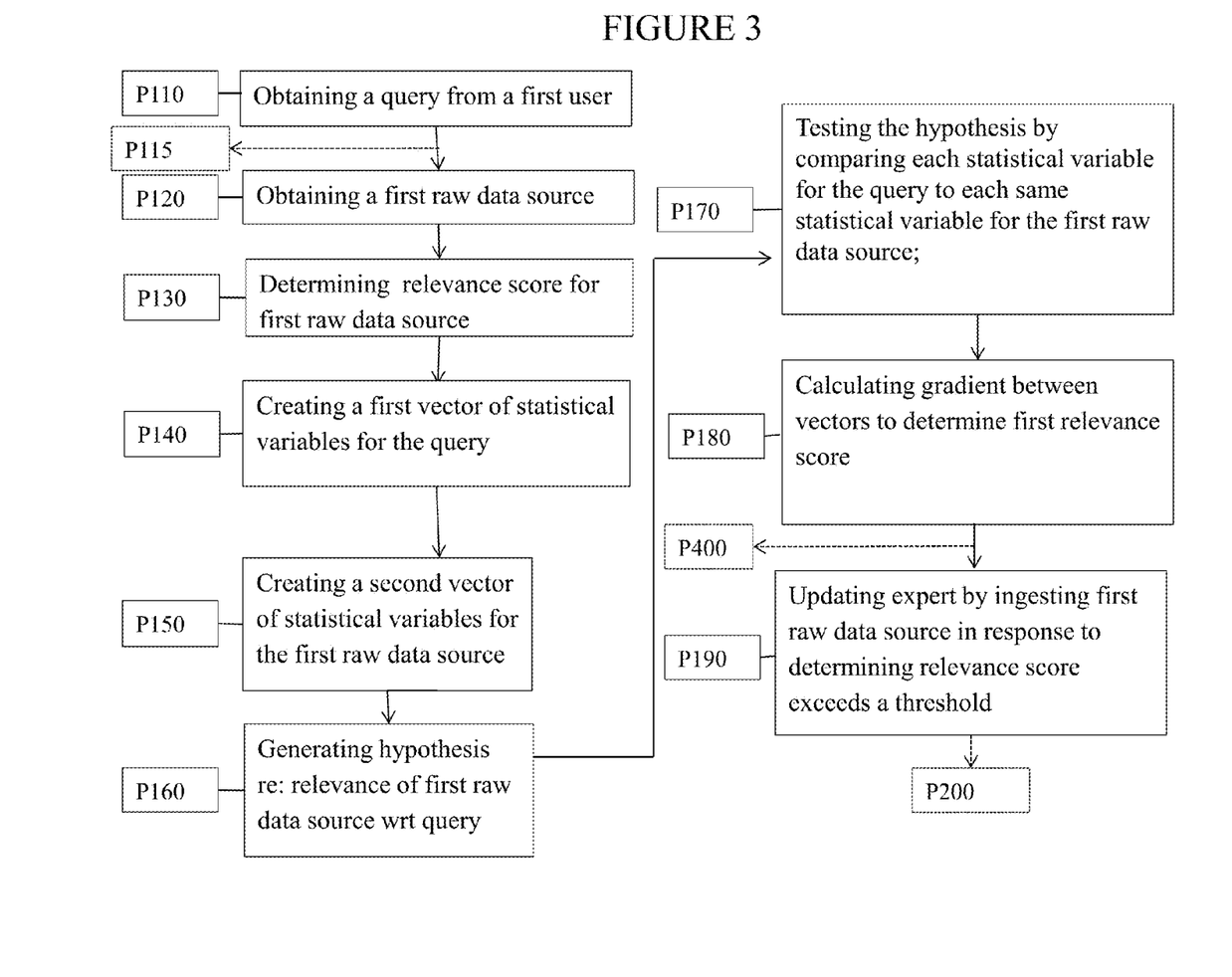
FIG. 3 shows a flow diagram illustrating a method according to various embodiments.

FIG. 3 shows a flow diagram illustrating a method according to various embodiments. FIG. 3 illustrates processes that may be performed according to aspects of the invention, to update an expert corpus set. Process P110 includes obtaining a query from a first user. The query obtained may be as simple as "what day is today". The answer to which may be dependent upon the time zone of the user who makes the query. The query may further be more refined and may deal with a subject which is understood by only very few experts.

A raw source is measured to determine the applicability to the corpora and whether the raw source should be added to the corpora as a new source. That is, a raw data source may be considered to be a data source that is being considered for addition to a corpus or to corpora, while a new source is a data source that has been determined to be useful to a corpus (or corpora) and has been, or will be added to the corpus (or corpora) as an additional data source. Process P120 includes obtaining a first raw data source. The first raw data source may be a published journal article, raw data from an experiment that resides only on a single computer, a company wiki entry or any other data that may be accessed by the system. Users may tag the first raw data source with any information that may assist the system in understanding aspects about the raw data source.

Process P130 includes determining a first relevance score for the first raw data source with respect to the query, determining the first relevance score may be accomplished by performing actions including those described by processes P140-P180. The first relevance score may be used to determine whether the expert corpus set should be updated with the information contained in first raw data source, or whether such information is not relevant (enough) to be ingested into the expert corpus set. Statistical categories such as entity type (entity), lexical answer type (LAT), and sentence focus frequencies (focus) are attached to each candidate corpus to aid in the decision of which candidate sources to accept and further, which ones to load. Process P140 includes creating a first vector of statistical variables for the query. An illustrative first vector may take the following form:

$$\bar{q}_i = \{\{LAT\}, \{Focus\}, \{Entity\}\}$$

Where the subscript i indicates the $i^{th}$ query within the question set. Categories LAT, Focus and Entity are shown as the entries in the vector. The vector q, defined above contains information about a query, i, contained in the question store.

Process P150 includes creating a second vector of statistical variables for the first raw data source, the statistical variables for the first raw data source having category types that are the same as the category types of the statistical variables for the query. An illustrative second vector may take the following form:

$$\overline{u} = \{\{LAT\}, \{Focus\}, \{Entity\}\}$$

The vector u defined above contains information about a candidate corpus from the user's computer, such as entity type (Entity), lexical answer type (LAT), and sentence focus frequencies (Focus) and is attached to the candidate corpus. While illustrative variables: LAT, Focus, and Entity are discussed, the number of variables may generally be equal to a number greater than three. These three variables are discussed for the sake of explanation and only three are discussed for the sake of brevity.

Process P160 includes generating a hypothesis regarding the relevance of the first raw data source with respect to the query. A hypothesis (H) about a given candidate corpus, e.g. the first raw data source, is generated from the vector, q, contained in the question store.

Process P170 includes testing the hypothesis by comparing each statistical variable for the query to each same statistical variable for the first raw data source. That is, after the hypothesis is generated in process P160, the hypothesis is tested by comparing each element of vector q, to each comparable element of vector u.

The probability that the hypothesis is true, given the corpora, equals the probability of the corpora, given the hypothesis, times the probability of the hypothesis, divided by the probability of the corpora, as follows: The hypothesis states that the question and answer system will be better given the Corpora, which includes the new candidate corpus. The likelihood represents the probability that the Corpora will be in the system given the Hypothesis multiplied by a prior probability. The prior yields the probability of the asserted hypothesis. Finally, the probability in the numerator is normalized by the probability that we have a certain Corpora.

$$P(H \mid Corpora) = \frac{P(Corpora \mid H)P(H)}{P(Corpora)}$$

Process P180 includes calculating a gradient between the first vector and the second vector to determine the first relevance score. The smaller the gradient, the more similar the statistical elements of the vectors. A calculation to determine the gradient may take the following form:

$$\nabla |\overline{q} - \overline{u}| = (\Sigma(LAT_q - LAT_u)) + (\Sigma(Focus_q - Focus_u)) + (\Sigma(Entity_q - Entity_u))$$

It should be noted that the summation for each type of feature depicts the possibility that there may be more than one LAT, Focus, and Entity. The above equation shows that the gradient between vectors q and u is equal to the sum of the differences between their respective components.

Process P190 includes updating the expert corpus set by ingesting the first raw data source into the expert corpus in response to determining the first relevance score exceeds a first threshold. Updating the expert corpus set is performed when a relevance score exceed a threshold, i.e. when there is a relatively small difference between the vectors. Minimizing the gradient of the distance between q, and u gives the maximum likelihood that the vectors include information relevant to one another. This relationship can be shown as follows:

$$\max(P(Corpora \mid H)) = \min(\nabla |\overline{q} - \overline{u}|)$$

A likelihood ration test may be applied to determine how much better (if at all) the null hypothesis is over the above defined alternative hypothesis. I.e.

$$D = -2\ln \frac{P(H_{null} \mid Corpora)}{P(H_{alternative} \mid Corpora)}$$

The value of D tells us how many more times the $P(H_{null}|corpora)$ is preferred over $P(H_{alternative}|Corpora)$. If the log likelihood ration test exceeds a threshold, e.g. is greater than one, then the corpora would be accepted, and the relative likelihood fails to exceed the threshold, e.g. is less than one then the corpora would be declined and the expert corpus set would not be updated with the first raw data source.

Figure 4:
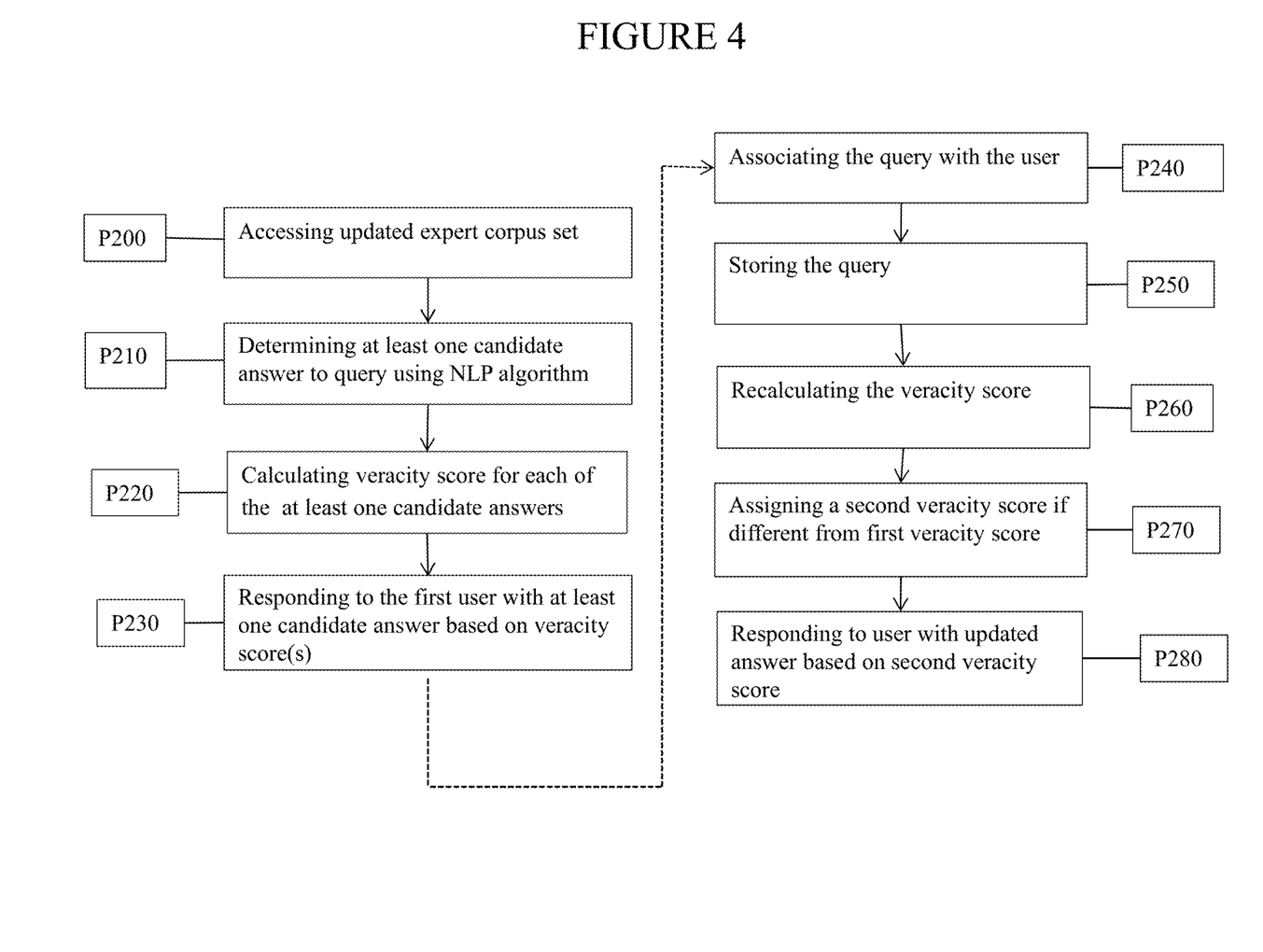
FIG. 4 shows a flow diagram illustrating optional processes that may be performed in conjunction with methods according to various embodiments.

FIG. 4 shows flow diagram components illustrating a first set of optional processes P200-P230, which may be performed in conjunction with methods according to various embodiments. FIG. 4 illustrates optional process P200 which includes accessing the updated expert corpus set. Accessing the updated expert corpus set may be performed using any appropriate means including a computer interface for a human or non-human user. Once the updated expert corpus set is accessed, process P210 may be performed. Process P210 includes determining at least one candidate answer to the query using an NLP algorithm; the determination of labels for candidate answers may be performed during a corpus training mode by human experts using some other reliable source, such as an encyclopedia. Labels may be binary in nature, i.e. true or false. An example of a situation where binary labels may be appropriate is when a user enters a query such as "what is the date today?" Depending on the user's time zone, the date may be one of two different dates. The binary labels would indicate true for a first date, and false for the other date (which would be true for users in another time zone. Also, labels for answers may be multinomial and more than one answer may be returned to the user based on such labels.

Process P220 includes calculating a veracity score for each of the at least one candidate answers. The veracity score indicates a correctness or an appropriateness of an answer. The veracity score is for a candidate answer as compared to the answer key. Prior to completion of an answer key, a corpus may be trained. During one or more training mode for the corpus, one or more human experts provide answers for answer key or labels for questions that can be in regular expression form. Once training is complete, and labels are applied to answers in an answer key, a corpus may be used for retrieval of answers to queries. A veracity score is needed for candidate answers only. Candidate answer labels are generated from the answer key. In general all candidate answers are generated at once. According to embodiments, queries are stored in the system and rerun as new corpus sets are added. Brand new candidate answers will be generated with one veracity score each.

Process P230 includes responding to the first user with at least one candidate answer based on the respective veracity scores. Veracity scores may be based on labels applied to answers during a training mode for a corpus set. As discussed above, the labels may be binary in nature, i.e. true or false. An example of a situation where binary labels may be appropriate is when a user enters a query such as "what is the date today?" Depending on the user's time zone, the date may be one of two different dates. The binary labels would indicate true for a first date, and false for the other date (which would be true for users in another time zone. Also, labels for answers may be multinomial and more than one answer may be returned to the user based on such labels. An example where multinomial labels may be applied to answers may be where a user queries "what are the most common symptoms for an eighty-year old woman who is suffering from heart disease?" Many candidate answers may be found by the system but only those candidate answers which are determined to be "most common symptoms" may have "high veracity score" applied to them. Candidate answers with having high enough veracity scores may be sent to the user in step P230. It should be understood that the term "high veracity score" is meant to be illustrative; a "low score" label may also indicate an appropriate answers to be sent to a user in process P230.

According to aspects, a query may be stored so that a user may be sent an updated answer after the expert corpus set is further updated. Processes P240-P280 include optional processes which may be performed to inform a user of such an updated answer, or updated answers. Optional process P240 includes associating a query with the first user. Associating the query with the first user may be performed using any appropriate computing device with storage or memory. Optional process P250 includes storing the query. The query may be stored in any appropriate storage or memory device and such a storage or memory device may be the same of different from what is used to store the association of the query with the user. Optional process P260 includes recalculating the veracity score for each of the at least one candidate answers in response to the expert corpus being further updated. It should be noted that a further updating of the corpus is not shown in FIG. 4, as such further updating may be performed continuously, and answers to queries may never change. Processes P240-280 are intended to be performed in cases where answers do change, for example in a case where a user queries the system, "who is the president of the United States?". The correct answer to this question will change over time. Recalculating the veracity score may be performed using the same algorithm used above with respect to P220. Optional process P270 includes assigning a second veracity score to at least one second candidate answer in response to determining that the at least one second candidate answer is not included in the at least one first candidate answer. It should be noted that the at least one candidate answer and the at least one second candidate answer may each include one candidate answer, or a plurality of candidate answers. The application of the second veracity score is assigned in a case where the at least one second candidate answer includes a plurality of answers where at least one of such answer is different from at least one of the first candidate answers. If all of the second candidate answers are the same as the first candidate answers, then a second veracity score may not be assigned.

Optional process P280 includes responding to the first user with an updated answer based on the second veracity scores. A user is sent an updated answer in cases where at least one second candidate answer is different from first candidate answers, and where the second veracity score indicates an appropriate answer to the query. For example, a user may not be sent an updated answer in a case where the expert corpus is updated, a second candidate answer is different from the first candidate answers, but the second candidate answer that is different is not assigned a label that indicates an appropriate answer to the query.

Figure 5:
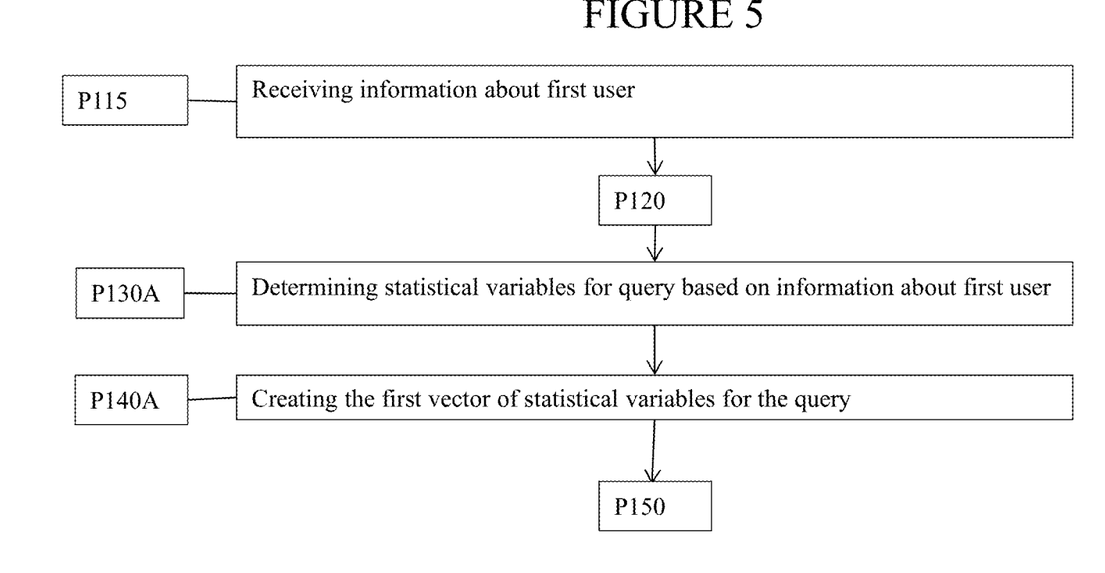
FIG. 5 shows flow diagram components illustrating optional processes that may be performed in conjunction with methods according to various embodiments.

FIG. 5 shows flow diagram components illustrating optional processes P115, P130A and P130A that may be performed in conjunction with methods according to various embodiments, for example those processes illustrated in FIG. 3. Process P115 includes receiving information about the first user. When information about the first user is used, determining of the first relevance scored of the first raw data source with respect to the query may include optional process P130A and P140B. Optional process P130A includes determining the statistical variables for the query based on the information about the first user. The information about the first user may be used to determine the statistical values by varying values attached to the statistical values in comparison with the statistical values discussed above with respect to process P140. The modification of statistical values may, for example, include adding additional weight to text in the corpora, assisting in assigning scores or selecting candidate answers such that they are more targeted towards the user based on information received about the user. The extra weight towards text in the Corpora that is relevant to the query helps to ensure we are using the correct data to generate candidate answers. That is, the system may assign a multiplier to each statistical value associated with a first user asking the query. The information about the user may include one of at least one user-inputted interest, a profession of the user or a professional category of the user. The assigning of a multiplier and subsequent manipulation of the statistical values may be based on information known about the user to help ensure that the selection of candidate answers yields relevant results or because the first user asking the query may be known to seek information relevant to the first raw data source or because it is known that the profession of the first user may be related to the information in the first raw data source. Or, alternatively, the first user asking the query may be known to seek information that is not closely related to the information in the first raw data source. Optional process P140A includes creating the first vector of statistical variables for the query.

Figure 6:
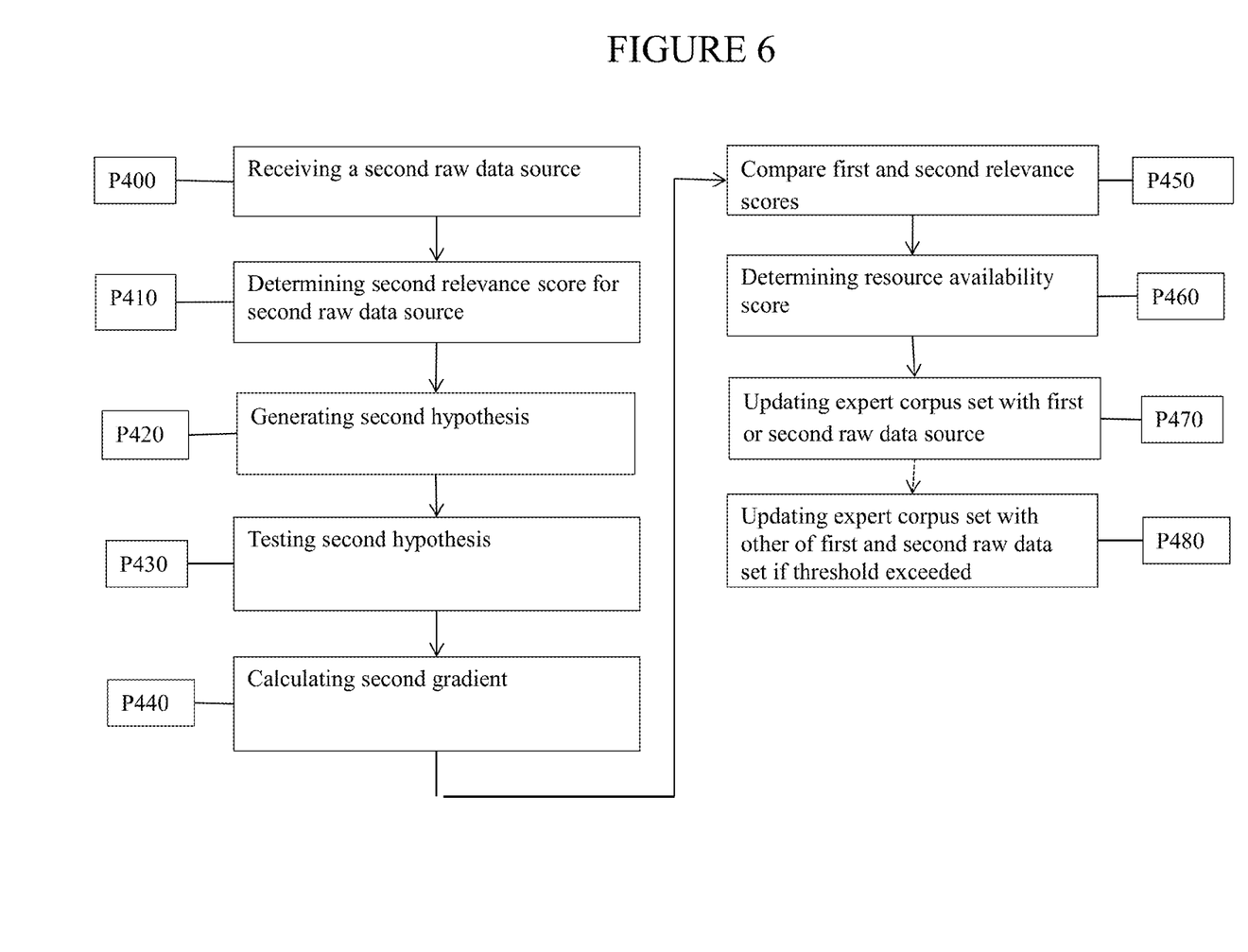
FIG. 6 shows flow diagram components illustrating optional processes that may be performed in conjunction with methods according to various embodiments.

FIG. 6 illustrates optional processes that may be performed according to aspects that prioritize the loading of two or more candidate corpus sets. This prioritization may be performed, for example in cases where computing resources are finite, for example, NLP-related resources. FIG. 6 illustrates optional process P400 which includes receiving a second raw data source. The second raw data source may be of the types discussed above with respect to the first raw data source. Second raw data sources may be found in drop zones of different users. Optional process P410 includes determining a second relevance score for the second raw data source by performing actions including those described below with reference to optional processes P420 through P440. Optional process P420 includes generating a second hypothesis. Optional process P430 includes testing the second hypothesis. Optional process P440 includes calculating a second gradient. Optional processes P420, P430 and P450, may be performed in manners similar to the analogous processes described above with respect to the generation and testing of the first hypothesis and calculation of the first gradient. The statistical variables associated with the second gradient may be the same as the statistical variable of the first gradient, and the calculations will not be repeated for the sake of brevity. Optional process P450 includes comparing the first relevance score and the second relevance score. Optional process P460 includes determining a resource availability score. In cases where NLP or other computing resources are limited, it may be desirable to delay the updating of the expert corpus set with less relevant raw data sources until resources become available, as NLP may be very resource intensive. Optional process P470 includes updating the expert by ingesting the one of the first and the second raw data sources into the expert having the higher relevance score if the higher of the first of the second relevance score exceeds the first threshold. As discussed above, the term "higher relevance score" is used to define relative scores. (It may be the case that a "lower score" indicates greater relevance, however, "higher relevance score" is used herein to indicate greater relevance, and therefore greater desirability for ingestion into the expert corpus set). Optional process P480 includes updating the expert by ingesting the other of the first and the second raw data sources into the expert having the lower relevance score if the resource availability score exceeds a second threshold. It should be understood that there may be cases where neither of the first or the second raw data sources may be deemed relevant enough for ingestion into the expert corpus set. Optional process While shown and described herein as a method and system for providing a confidence-based inference from evidence-based medical records and natural language input, it is understood that aspects of the invention further provide various alternative embodiments. For example, in one embodiment, the invention provides a computer program fixed in at least one computer-readable medium, which when executed, enables a computer system to perform a method of determining a characteristic of an optical mask. To this extent, the computer-readable medium includes program code, such as relevance program 130 (FIG. 2), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of determining a characteristic of an optical mask using optical metrology data and simulation data. In this case, a computer system, such as computer system 102 (FIG. [ ]), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to characterize an optical mask as described herein. In this case, the service provider can manage (e.g., create, maintain, support, etc.) a computer system, such as computer system 102 (FIG. 2), that performs a process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of updating an expert corpus set, the method comprising:
    obtaining a query from a first user;
    obtaining a first raw data source;
    determining a first relevance score for the first raw data source with respect to the query, by performing actions including:
        creating a first vector of statistical variables for the query using at least one natural language processing (NLP) socket, the statistical variables of the first vector having category types;
        creating a second vector of statistical variables for the first raw data source, the statistical variables for the first raw data source having category types that are the same as the category types of the statistical variables for the query; and
        generating a hypothesis regarding the relevance of the first raw data source with respect to the query;
        testing the hypothesis by comparing each statistical variable for the query to each same statistical variable for the first raw data source; and
        calculating a gradient between the first vector and the second vector to determine the first relevance score;
    updating the expert corpus set by ingesting the first raw data source into the expert corpus in response to determining the first relevance score exceeds a first thresholds;
    accessing the updated expert corpus;

determining at least one candidate answer to the query using an NLP algorithm;
calculating a veracity score for each of the at least one candidate answers based on the NLP algorithm; and
responding to the first user with at least one first candidate answer based on the veracity score.

2. The method of claim 1, further comprising:
associating the query with the first user;
storing the query;
recalculating the veracity score for each of the at least one candidate answers in response to the expert corpus being updated;
assigning a second veracity score to at least one second candidate answer in response to determining that the at least one second candidate answer is not included in the at least one first candidate answer; and
responding to the first user with an updated answer based on the respective second veracity score labels.

3. The method of claim 1, further comprising:
receiving information about the first user, and
wherein the determining of the first relevance score for the first raw data source with respect to the query includes:
determining the statistical variables for the query based on the information about the first user; and
creating the first vector of statistical variables for the query.

4. The method of claim 3, wherein the information about the user includes one of at least one user-inputted interest, a profession of the user or a professional category of the user.

5. The method of claim 1 wherein the categories include at least one of lexical answer type, sentence focus frequencies or entity type.

6. The method of claim 1, further comprising: prior to updating the expert:
receiving a second raw data source;
determining a second relevance score for the second raw data source by performing actions including,
generating a second hypothesis regarding the relevance of the second raw data source;
testing the second hypothesis by comparing each statistical variable for the second raw data source to each same statistical variable for query;
calculating a second gradient between the first vector and the third vector to determine the second relevance score;
comparing the first relevance score to the second relevance score; and
determining a resource availability score;
updating the expert corpus set by ingesting the one of the first and the second raw data sources into the expert having the higher relevance score if the higher of the first of the second relevance score exceeds the first threshold;
and updating the expert corpus set by ingesting the other of the first and the second raw data sources into the expert having the lower relevance score if the resource availability score exceeds a second threshold.

7. A system comprising:
at least one computing device configured to update an expert corpus set, by performing actions including:
obtaining a query from a first user;
obtaining a first raw data source;
determining a first relevance score for the first raw data source with respect to the query, by performing actions including:
creating a first vector of statistical variables for the query using at least one natural language processing (NLP) socket, the statistical variables of the first vector having category types;
creating a second vector of statistical variables for the first raw data source, the statistical variables for the first raw data source having category types that are the same as the category types of the statistical variables for the query;
generating a hypothesis regarding the relevance of the first raw data source with respect to the query;
testing the hypothesis by comparing each statistical variable for the query to each same statistical variable for the first raw data source; and
calculating a gradient between the first vector and the second vector to determine the first relevance score;
updating the expert corpus set by ingesting the first raw data source into the expert corpus in response to determining the first relevance score exceeding a first thresholds;
accessing the updated expert corpus;
determining at least one candidate answer to the query using an NLP algorithm;
calculating a veracity score for each of the at least one candidate answers based on the NLP algorithm; and
responding to the first user with at least one first candidate answer based on the veracity score.

8. The system of claim 7, further comprising:
associating the query with the first user;
storing the query;
recalculating the veracity score for each of the at least one candidate answers in response to the expert corpus being updated;
assigning a second veracity score to at least one second candidate answer in response to determining that the at least one second candidate answer is not included in the at least one first candidate answer; and
responding to the first user with an updated answer based on the respective second veracity score.

9. The system of claim 7, further comprising:
receiving information about the first user, wherein the determining of the first relevance score for the first raw data source with respect to the query includes:
determining the statistical variables for the query based on the information about the user; and
creating the first vector of statistical variables for the query.

10. The system of claim 9, wherein the information about the user includes one of at least one user-inputted interest, a profession of the user or a professional category of the user.

11. The system of claim 7, wherein the categories include at least one of lexical answer type, sentence focus frequencies or entity type.

12. The system of claim 7, further comprising: prior to updating the expert corpus set:
receiving a second raw data source;
determining a second relevance score for the second raw data source by performing actions including:
generating a second hypothesis regarding the relevance of the second raw data source;
testing the second hypothesis by comparing each statistical variable for the second raw data source to each same statistical variable for query;
calculating a second gradient between the first vector and the third vector to determine the second relevance score;
comparing the first relevance score to the second relevance score;

determining a resource availability score;
updating the expert corpus set by ingesting the one of the first and the second raw data sources into the expert having the higher relevance score if the higher of the first or the second relevance score exceeds the first threshold; and updating the expert corpus set by ingesting the other of the first and the second raw data sources into the expert having the lower relevance score if the resource availability score exceeds a second threshold.

13. A computer program product comprising program code stored on a non-transitory computer-readable medium, which when executed by at least one computing device, enables the at least one computing device to implement a method of updating an expert corpus set by performing actions including:
   obtaining a query from a first user;
   obtaining a first raw data source;
   determining a first relevance score for the first raw data source with respect to the query, by performing actions including:
      creating a first vector of statistical variables for the query using at least one natural language processing (NLP) socket, the statistical variables of the first vector having category types including at least one of lexical answer type, sentence focus frequencies or entity type;
      creating a second vector of statistical variables for the first raw data source, the statistical variables for the first raw data source having category types that are the same as the category types of the statistical variables for the query;
      generating a hypothesis regarding the relevance of the first raw data source with respect to the query;
      testing the hypothesis by comparing each statistical variable for the query to each same statistical variable for the first raw data source; and
      calculating a gradient between the first vector and the second vector to determine the first relevance score;
   updating the expert corpus set by ingesting the first raw data source into the expert corpus in response to determining the first relevance score exceeding a first thresholds;
   accessing the updated expert corpus;
   determining at least one candidate answer to the query using an NLP algorithm;
   calculating a veracity score for each of the at least one candidate answers based on the NLP algorithm; and
   responding to the first user with at least one first candidate answer based on the veracity score.

14. The computer program product of claim 13, further comprising:
   associating the query with the first user;
   storing the query;
   recalculating the veracity score for each of the at least one candidate answers in response to the expert corpus being updated;
   assigning a second veracity score to at least one second candidate answer in response to determining that the at least one second candidate answer is not included in the at least one first candidate answer; and
   responding to the first user with an updated answer based on the respective second veracity score.

15. The computer program product of claim 13, further comprising:
   receiving information about the first user, wherein the determining of the first relevance score for the first raw data source with respect to the query includes:
      determining the statistical variables for the query based on the information about the user; and
      creating the first vector of statistical variables for the query.

16. The computer program product of claim 15, wherein the information about the user includes one of at least one user-inputted interest, a profession of the user or a professional category of the user.

17. The computer program product of claim 13, further comprising: prior to updating the expert corpus set:
   receiving a second raw data source;
   determining a second relevance score for the second raw data source by performing actions including,
      generating a second hypothesis regarding the relevance of the second raw data source;
      testing the second hypothesis by comparing each statistical variable for the second raw data source to each same statistical variable for query;
      calculating a second gradient between the first vector and the third vector to determine the second relevance score;
      comparing the first relevance score to the second relevance score; and
      determining a resource availability score;
   updating the expert corpus set by ingesting the one of the first and the second raw data sources into the expert having the higher relevance score if the higher of the first of the second relevance score exceeds the first threshold; and updating the expert corpus set by ingesting the other of the first and the second raw data sources into the expert having the lower relevance score if the resource availability score exceeds a second threshold.

* * * * *